Sept. 22, 1936.   R. H. OGDEN   2,055,360
METHOD OF WELDING WHITE METAL
Filed May 27, 1935

Inventor
Roland H. Ogden
by Orwig & Hague Attys.

Patented Sept. 22, 1936

2,055,360

UNITED STATES PATENT OFFICE 2,055,360

METHOD OF WELDING WHITE METAL

Roland H. Ogden, Des Moines, Iowa

Application May 27, 1935, Serial No. 23,796

1 Claim. (Cl. 113—112)

By the term "white metal" as herein employed, I refer to metal using zinc as a base, with various alloys. One illustration thereof is that found in the patent to Peirce and Anderson, August 17, 1926, No. 1,596,761, and which is therein defined as comprising a "zinc-base alloy including 1.0 to 15% aluminum and 0.1 to 0.3% magnesium."

Heretofore, the welding of white metal has not been satisfactory, and experts in the welding art customarily recommend that it is inadvisable to attempt the welding of white metal if the welded portions are to be subjected to strains and stresses such as the original metal was capable of successfully withstanding.

The object of my invention is to provide a method for welding white metal which may be readily, quickly and easily practiced by those skilled in the welding art, and with the use of the oxy-acetylene torch now commonly employed in the welding arts.

More specifically, it is my object to provide a method of this character by which the metal from the weld rod may be united to the metal of the parts being welded without there being interposed between said metals the thin "skin" of an oxidized metal such as is usually present when the methods now in common use are employed, and to further provide a method by which the metals being welded are not subjected to such intense heat as will result in the gasification of any parts of the metals being welded such as will change the proportions of the metal alloys and thereby weaken them, and further provide a welding method by which the welded parts will have substantially the same strength to resist strains and stresses as does the original white metal being welded.

My invention consists in the arrangement and combination of the various steps by which my improved process is carried out, as hereinafter more fully set forth, pointed out in my claim, and illustrated in the accompanying drawing, in which:

Figure 3:
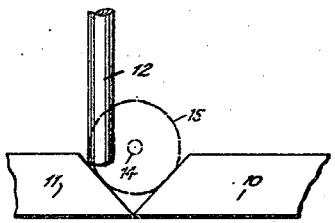
Figure 3 shows an end elevation illustrating the two articles to be welded together, and the weld rod, and by dotted lines the position of the secondary area of an oxy-acetylene flame, to illustrate their relative positions.
Figure 5:
Figure 5 shows a similar view illustrating the completed welding.
Figure 2:
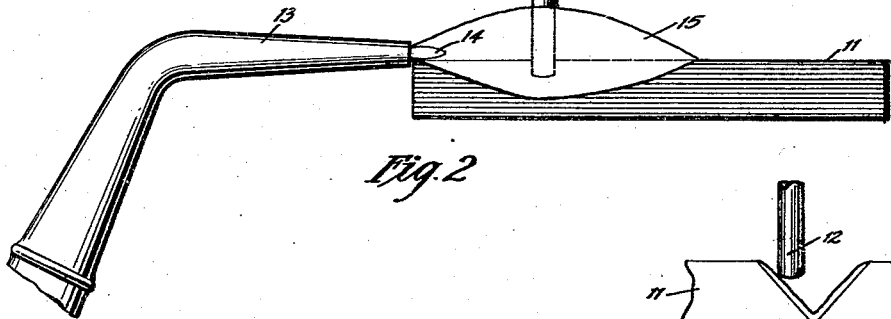
Figure 2 shows a side view with one of the articles to be welded removed, and illustrating the relative positions of the flame and weld rod.
Figure 4:
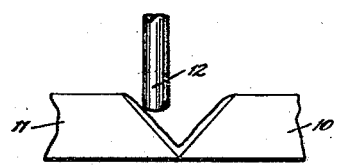
Figure 4 shows a view similar to Figure 3 illustrating the first layer of a weld rod as applied to the articles to be welded.
Figure 1:
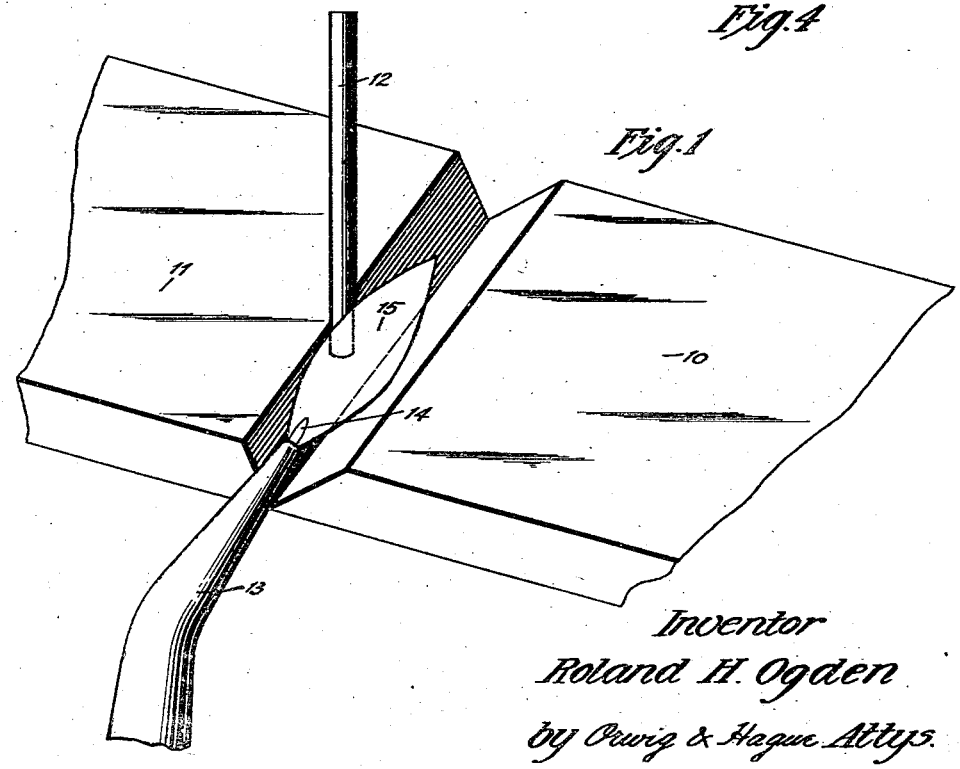
Figure 1 show a perspective view illustrating two pieces of metal to be welded together and formed with their adjacent edges in V shape, and showing an acetylene flame and the weld rod, all of which are in such position that the parts of the articles being welded, and the weld rod, are all arranged in such positions as to be subjected to a secondary heat area of the oxy-acetylene flame.

Referring to the accompanying drawing, I have used the reference numerals 10 and 11 to indicate the two parts of white metal to be welded together, the adjacent surfaces of which are preferably ground or otherwise shaped to form a V, with the parts substantially touching at their lower edges, and the sides inclined upwardly and away from each other at an angle of about 45°.

When the metal has thus been prepared and the parts placed together, as shown in the drawing, the adjacent surfaces will be clean.

The weld rod, indicated by the numeral 12, is of substantially the size and shape shown in the accompanying drawing, and is preferably made of the same material as that heretofore quoted from the said patent to Peirce, et al.

In this connection I have found by repeated experiences and demonstrations that the presence of the magnesium element in the weld rod greatly strengthens the welded joint as compared with weld rods lacking in this magnesium content.

The oxy-acetylene torch which I employ is indicated generally by the reference numeral 13, and is of the construction now commonly employed by expert welders. I preferably employ a relatively small tip known to the trade as No. 1 or No. 2 size.

In preparing the flame for welding purposes I preferably adjust the tank gauges so that I obtain from one to two pounds pressure of oxygen and about five pounds pressure of acetylene. With this arrangement there is usually only a very small central inner flame of relatively greater heating value, and if there is such central inner flame, I adjust the torch by reducing the oxygen pressure until such central flame is entirely eliminated. In this respect the flame differs from the welding flame usually employed for welding purposes.

In the accompanying drawing I have used the reference numeral 14 to indicate the small central white portion of the flame, and the reference numeral 15 to indicate the outer or secondary cone or portion of the flame.

The operator then first applies the flame from the torch directly to the adjacent edges of a portion of the V notch between the articles to be welded, and this continues until the surfaces to which the flame is being applied start to assume a liquid, as distinguished from a solid, character, and the direct application of the flame is discontinued before any of the metal to which the flame was applied has commenced to run. Then, the welding rod is, in the same manner, heated to the same temperature and until the operator can visibly see that the metal on the surface of the weld rod appears to be in liquid condition as distinguished from solid.

When this has been done, the flame is turned to a position parallel to the V-shaped opening between the metals to be welded, and then the weld rod is inserted in the flame in a substantially upright position; and in this connection it is important that both the rod and the adjacent portions of the surfaces to be welded be maintained in the secondary area of the flame from the torch and not in the direct path of the white central flame from the torch. In this manner, the metals to be welded together are all maintained at such temperature as will hold them in condition with their surfaces showing a molten condition and not in such condition that the metal will run or flow by gravity from either the weld rod or the surfaces being welded.

When this condition has been attained, then the operator touches the rod to the adjacent surfaces of the articles being welded, and as soon as it is thus touched, a portion of the rod will flow into, and fuse with the metal of the surfaces being welded, and form a homogeneous weld.

I preferably first go over the entire surface to be welded by this means of touching the rod thereto when in the condition set forth, thus forming a relatively thin layer of weld rod over the entire surfaces being welded. I then continue the operation of maintaining the weld rod and surfaces to be welded, at said temperature, and repeatedly touching the weld rod to the surfaces until the V is completely filled.

I then preferably add slightly more of the weld rod material on top of the V, and finally, in completing the job, file or grind off the metal thus applied above the V, to make a finished job.

I have demonstrated in actual practice that when the weld rod is heated only slightly beyond the amount heretofore defined, that the metal will drop from the weld rod into the V, and that when the metal thus drops that oxidization will form a thin "skin" surrounding the drop, and when the drop hardens, an imperfect union will be made between the drop and the V because of the presence of this thin oxidized "skin". When, however, the rod and the surfaces being welded are all brought to the desired heated condition, as before described, then when the weld rod is touched upon the surfaces being welded, the weld rod metal will flow into the V and become thoroughly united with the metal at the surfaces of the V and without forming this oxidized "skin".

I have also found by repeated tests, that when the flame is directed downwardly or at substantially right angles to the V, it is practically impossible to prevent portions of the metal from being heated to such a degree as will cause gasification of some of the metals of the alloy, and when this occurs, the relative proportions of the metals are changed and consequently weakened, and bubbles or spaces will be formed in the body of the metal being welded, and consequently the maximum strength of the metals is not developed, whereas, by my improved method, and with the flame substantially paralleling the V surfaces, the metals may be easily and conveniently maintained at proper temperature, and by touching the weld rod to the articles to be welded, when at the proper temperature, the metals may be fused together to form a perfect union and without the presence of bubbles or spaces in the area being welded.

I claim as my invention:

The method of welding white metal, which consists in first grinding off the surfaces to be welded and forming a V at their adjacent edges, then applying an oxy-acetylene torch to portions of said surface until the metal thereof is visually seen to assume a liquid appearance, providing a weld rod of white metal and applying the torch to it until its end portion presents the same liquid appearance, then placing the flame to position substantially parallel with the sides of the V and holding the weld rod in a substantially upright position with the outer edge portions only of the flame contacting with the surfaces of the articles being welded and the weld rod, then repeatedly touching the weld rod to the surfaces being welded and forming a relatively thin layer of weld rod over the entire surface being welded, and finally continuing said touching of the weld rod until the V is completely filled.

ROLAND H. OGDEN.